United States Patent [19]

Chow et al.

[11] Patent Number: 5,896,294

[45] Date of Patent: Apr. 20, 1999

[54] AN APPARATUS AND METHOD FOR INSPECTING MANUFACTURED PRODUCTS FOR DEFECTS IN RESPONSE TO IN-SITU MONITORING

[75] Inventors: Wanyee Apple Chow, San Francisco; Ming C. Chen, Milpitas; Yung-Tao Lin, Fremont; Ying Shiau, San Jose, all of Calif.

[73] Assignee: Advanced Micro Devices, Inc., Sunnyvale, Calif.

[21] Appl. No.: 08/815,353

[22] Filed: Mar. 11, 1997

[51] Int. Cl.$^6$ .................... G06F 19/00; G06G 7/64; G06G 7/66

[52] U.S. Cl. .................. 364/468.28; 364/468.16; 364/468.17; 364/468.19; 364/551.01

[58] Field of Search .................. 364/468.17, 468.28, 364/551.01, 580, 578, 420, 490, 468.15, 468.16, 468.19; 395/21, 22, 24, 26, 27; 438/9, 16, 17; 324/765; 382/145; 437/8, 939

[56] References Cited

U.S. PATENT DOCUMENTS

| | | | |
|---|---|---|---|
| 5,497,381 | 3/1996 | O'Donoghue et al. | 371/28 |
| 5,598,341 | 1/1997 | Ling et al. | 364/468.17 |
| 5,604,134 | 2/1997 | Chang et al. | 437/8 |
| 5,640,493 | 6/1997 | Skeirik | 395/23 |
| 5,654,903 | 8/1997 | Reitman et al. | 364/551.01 |
| 5,658,423 | 8/1997 | Angell et al. | 438/9 |
| 5,665,609 | 9/1997 | Mori | 438/16 |

*Primary Examiner*—Reba I. Elmore
*Assistant Examiner*—Ramesh Patel

[57] ABSTRACT

An apparatus and method for selecting products to inspect for defects performs in-situ monitoring of a processing tool during a manufacturing processing step. The data from the in-situ monitoring for a test run of products is correlated by a neural network with data collected during inspection of the test products for defects. During a production run of products, the in-situ monitor data is provided to the neural network which, based on the input data and the correlation, predicts the values of the data that would be collected upon inspection of the products. Specific products from the production run are selected for inspection based upon the predicted values.

19 Claims, 4 Drawing Sheets

FOR INSPECTING MANUFACTURED PRODUCTS FOR DEFECTS IN RESPONSE TO IN-SITU MONITORING

BACKGROUND OF THE INVENTION

1. Technological Field of the Invention

The present invention relates to the field of manufacturing products, such as semiconductor chips, and more particularly, to a method and apparatus for selecting which products to inspect for defects during the manufacturing process.

2. Description of the Related Art

The manufacture of most products, such as wafers containing semiconductor devices, requires a number of discrete processing steps to create the product. For the example of wafers, a number of discrete steps are needed to produce a packaged semiconductor circuit device from raw semiconductor material. The starting substrate is usually a slice of single crystal silicon referred to as a wafer. Circuits of a particular type are fabricated together in batches of wafers called "lots" or "runs". The fabrication process creates regular arrays of a circuit on the wafers of a lot. During processing, the individual wafers in a lot may go through individual processing steps one at a time or as a batch. At the completion of wafer processing, the wafers are tested to determine circuit functionality. Later the wafers are sliced, the functioning products are packaged, and further testing occurs prior to use by the customer.

Data gathered during the course of wafer processing is used to diagnose yield problems and forms the basis of yield improvement efforts. For example, during semiconductor processing, particle contamination in the processing tool will normally have a deleterious affect on product yield. In order to collect data on particle contamination, a sensor may be used that senses the level of particle contamination in the processing tool chamber, in the outflow gas, or other area.

In known arrangements, this in-situ sensor for measuring a parameter or operating condition, such as particle contamination, is controlled independently of the processing tool. This sensor also has its own separate database for storing the sensor data that is collected during the manufacturing processing step performed by the processing tool.

Although in-situ particle monitors provide a 100% monitoring of particle deposition at the wafer level, they do not always accurately predict the level of contamination that is actually contained on the wafers. This is because different process recipes will have different counts of particles in the outflow of gas, without necessarily being too high for that particular process. Also, the particle count in certain regions of the processing tool may not accurately reflect the level of contamination on wafers currently being processed in the processing tool.

In order to obtain accurate information regarding the contamination of a wafer, the surface of an actual wafer is scanned (a "surface scan") using an inspection machine, such as the Inspex wafer scanning machine manufactured by Inspex of Boston. These wafers are normally selected at random, scanned for defects, and then the problem in the processing tool, if any, will then be addressed. This random selection of wafers to be inspected generates a number of problems. For example, wafers must be removed during the manufacturing process, which presents the possibility of adding more defects to the wafers. Also, this conventional method adds a step to the manufacturing process, increasing the cost, delaying the process, and adding more particles to the wafer.

Hence, although wafer scans are very reliable, to the extent that they may be used to shut down a processing line, the costs associated with the random selection and inspection of wafers effectively prohibits 100% sampling of the manufactured wafers.

SUMMARY OF THE INVENTION

There is a need for a method and apparatus for performing effectively 100% sampling of the wafers during a manufacturing processing step, but without incurring the extra costs of surface scanning of each individual wafer.

This and other needs are met by the present invention which provides a method of inspecting products for defects in response to in-situ monitoring of a manufacturing process. In this method, in-situ monitoring of the manufacturing process is performed for a test set of products, such as semiconductor wafers, to collect a set of particle counts in the outflow of the processing chamber during the processing of the wafers. An inspection of the wafers is then performed after the manufacturing processing step to collect defect data of the test set of wafers. In certain embodiments of the present invention, this inspection includes scanning of the surface of the semiconductor wafers to determine the particle counts on the semiconductor wafers. A correlation is then made for the test wafers between the in-situ particle counts and the surface particles.

After the correlation has been performed, a second set of products (the production run of wafers) is manufactured. During this manufacturing, in-situ monitoring of the manufacturing process is performed to collect the in-situ particle counts for the second set of products. Based upon the correlation, and the in-situ particle count data that has been collected for the second set of wafers during the manufacturing process, individual wafers are selected from among the second set of wafers to inspect for the surface particles.

With the present invention, a 100% sampling is effectively performed, without the need for surface scanning of each individual wafer that has been produced. This is accomplished by correlating the in-situ particle monitoring data, which provides a 100% sampling, with the wafer surface scanning data. Since an accurate correlation was previously formed following the initial test run of wafers, the information from the in-situ particle monitoring can be used to identify those wafers in the production run that should be inspected. Hence, an effective 100% sampling rate of the semiconductor wafers is achieved, without the need and added expense of inspecting each individual semiconductor wafer with a surface scanning.

The earlier stated needs are also met by another embodiment of the present invention which provides an arrangement for monitoring a manufacturing process performed on a product. The arrangement includes an in-situ monitor that monitors at least one parameter of the manufacturing process and generates in-situ manufacturing process data. A product inspection device inspects the products and generates product inspection data. A neural network is provided that receives the in-situ manufacturing process data and the product inspection data. The neural network correlates in-situ manufacturing process data and the product inspection data. A process controller is provided that identifies which product should be inspected by the product inspection device based on the in-situ manufacturing process data and the correlation between the in-situ manufacturing process data and the product inspection data.

The use of a neural network assists in the wafer selection process for defect scanning by correlating the particle monitoring data with the surface scan data. The in-situ particle monitor information is analyzed in real-time so that the monitored particle data will accurately identify which wafers should be selected for defect scanning. This ensures 100% identification and inspection of all wafers with potentially high surface scan counts. Providing the neural network with feedback from the inspection of selected wafers in the production run has the advantage of continuously increasing the accuracy of the correlation with continued use.

The foregoing and other features, aspects and advantages of the present invention will become more apparent from the following detailed description of the present invention when taken in conjunction with the accompanying drawings.

DETAILED DESCRIPTION OF ILLUSTRATIVE EMBODIMENTS

The present invention will be described in the context of the manufacture of semiconductor devices. This is exemplary only, however, as the method of the invention is applicable to the manufacture of other types of products produced by one or more processing steps, using an automatically controlled processing tool.

Figure 1:
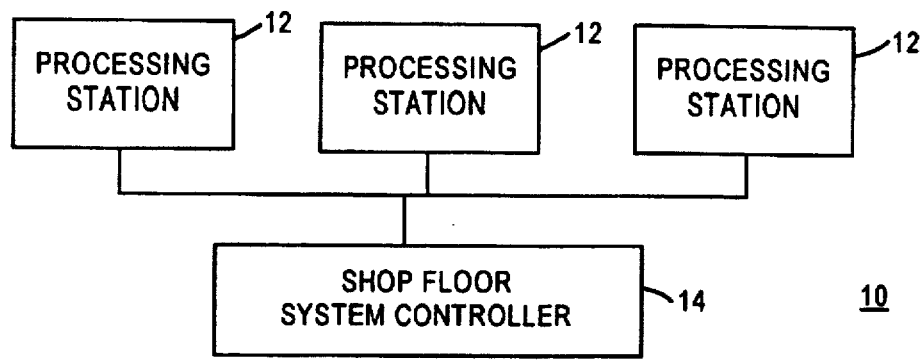
FIG. 1 is a block diagram of a manufacturing arrangement with a plurality of processing stations constructed in accordance with an embodiment of the present invention.

FIG. 1 is a block diagram of a processing arrangement constructed in accordance with an embodiment of the present invention. The processing arrangement 10 has a plurality of processing stations 12 that perform different steps of a manufacturing process. A shop floor system controller 14 communicates with the processing stations 12 to control the overall manufacturing processing of the wafers.

Figure 2:
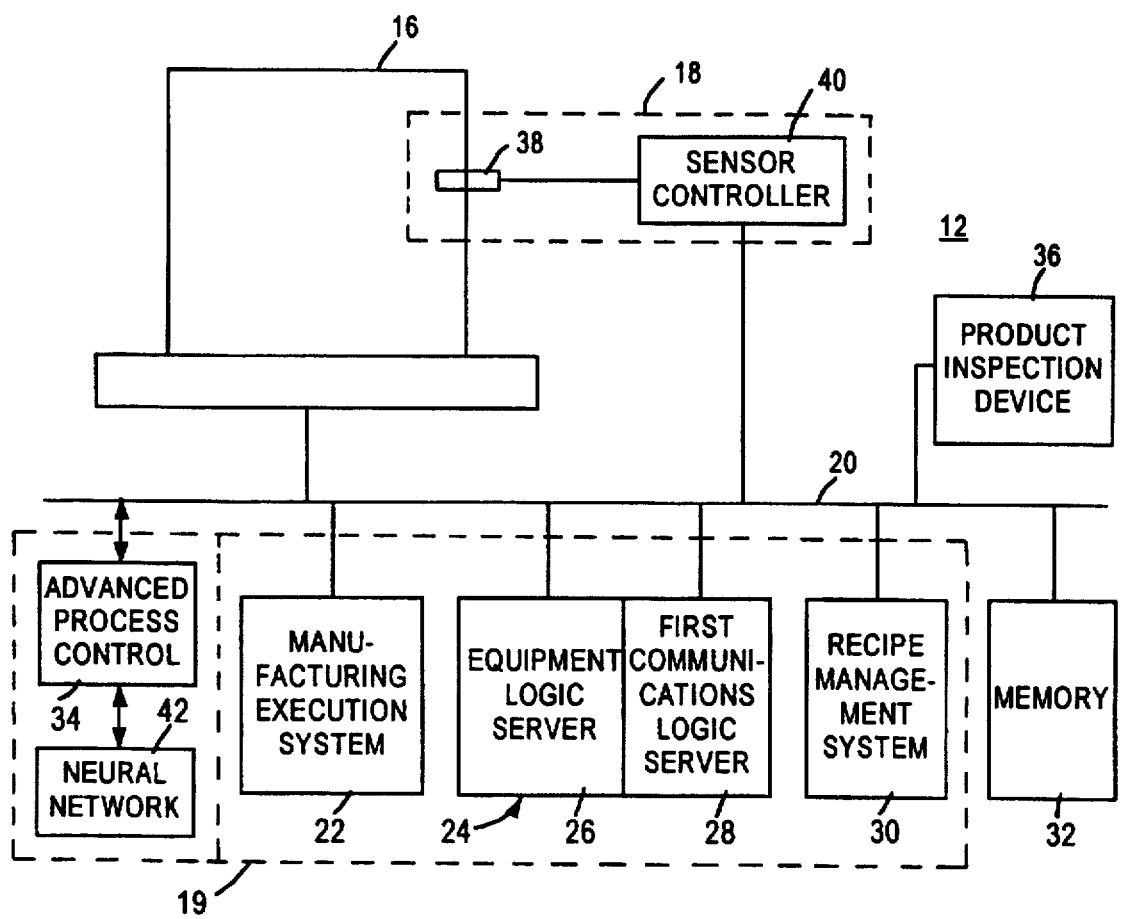
FIG. 2 is a block diagram of a single processing station of FIG. 1 constructed in accordance with an embodiment of the present invention.

A single processing station 12 is depicted in block diagram form in FIG. 2. This exemplary embodiment of the processing station 12 includes a processing tool 16 that performs at least one manufacturing process step of the manufacturing process on a product, such as a wafer. An example of a processing tool 16 is a deposition tool, such as that manufactured by Novellus of San Jose, Calif. or the P5000 deposition tool manufactured by Applied Materials of California, or an etch tool such as the LAM Rainbow Etch or the Applied Materials etching tool. Although these processing tools are given as examples, the present invention is applicable to any processing tool in which an in-situ sensor may be applied.

The processing tool 16 receives wafers, either from an entry point to the manufacturing process, or from another processing station. Under the control of a computer 19, the processing tool 16 performs one or more manufacturing processing steps on the wafer. The computer 19 is a conventional computer that communicates with the processing tool 16 using the Semiconductor Equipment Communications Standard (SECS) I, II, that is an industry standard for communicating with processing tools. This communication standard essentially comprises software that controls and gathers data from the processing tool 16 itself. A separate computer 18 may be provided for each processing station 12, or a single computer serving as the shop floor system controller 14 may act as the computer 19 for each of the different processing stations 12.

In operation, a single wafer or a plurality of wafers, such as twenty-four wafers, are moved into the processing tool 16. At the same time, an operator will enter identification data into the computer 19 which stores this data into a memory (or database) 32. The communication between the computer 19 and the memory 32 is carried over a communications bus 20.

The computer 19 has a number of functional blocks that are implemented in software in the exemplary embodiment. These functional blocks are a manufacturing execution system 22, an equipment interface 24, a recipe management system 30, and an advanced process control 34. An example of a manufacturing execution system is Workstream, manufactured by Consilium of Mountain View, Calif. In short, the manufacturing execution system 22 is a database application to control the information flow of the manufacturing process. It also controls access to the memory 32.

The equipment interface 24 communicates with the recipe management system 30 and the manufacturing execution system 22. The equipment interface 24 receives "context information" from the manufacturing execution system 22 and forms a message to send to the recipe management system 30. The context information is that information which uniquely identifies the process that is going to occur at that step in the operation, such as lot number, entity, product, route, etc.

The recipe management system 30 produces a "recipe" based on the message provided by the equipment interface 24. The recipe is essentially the process instructions, such as the pressure, temperature, gas flow, etc. for that product in that step. The recipe is provided to the equipment interface 24 which then sets up the processing tool 16 and passes on the recipe to the processing tool 16. The manufacturing process steps are then performed by the processing tool 16 in accordance with the setup and the recipe. Some data collection is performed by the processing tool 16, such as reports on when the processing began, ended, etc. This information is sent back to the manufacturing execution system 22 and stored in a lot and entity record in the memory 32.

In the present invention, the equipment interface 24 has two logical sections. An equipment logic server 26 primarily communicates with the manufacturing execution system 22. A communications logic server 28 primarily communicates with a sensor 38, as will be described later.

Equipment interfaces that include an equipment logic server and a single communications logic server are well known. For example, an equipment interface such as the configurable equipment interface originally produced by Thesis of Richardson, Tex. and further developed by AMD as an equipment interface, is known. Another example of a suitable equipment interface is that sold as Graphiq by Fastek of Scotts Valley, Calif. In certain embodiments of the present invention, however, the equipment interface 24 is provided with an additional communications logic server dedicated to communicating with the in-situ sensor 38. The recipe management system 30 is, in the exemplary embodiment, a commercially available product from Consilium of Mountain View, Calif.

In order to provide particle data to determine particle contamination during the manufacturing process at a processing station 12, a sensor arrangement 18 is provided in-situ. A suitable in-situ sensor 18 is the HYT sensor, made by High Yield Technology, a division of Pacific Scientific of Sunnyvale, Calif. The typical HYT sensor includes a sensor, a controller, a computer and a separate database. However, the separate nature of the sensor database from the memory 32 makes it difficult to correlate the particle contamination data with the surface scan data.

In order to overcome this problem, the present invention uses only a portion of the conventional sensor 18. The sensor arrangement 18 of the present invention thus employs only the sensor portion 38 that is situated in an area of the processing tool to sense particle contamination, and a sensor controller 40 that controls operation of the sensor portion 38. The controller 40 is coupled to the communication bus 20 to receive instructions (via an RS232 line, for example) as well as provide in-situ sensor data to the communications bus 20 which can then be stored in the database memory 32.

During the operation of conventional systems, the in-situ particle monitor 18 provides 100% real-time monitoring of particle deposition at the wafer level. However, one of the problems in identifying with precision the wafers which should be inspected for defects is that the in-situ particle monitor 18 provides too much data. An operator cannot correlate all of this data to the wafers that are exiting the processing tool 16. In other words, even though an operator will monitor the exhaust line through the in-situ particle monitor 18, it is difficult to correlate the in-situ manufacturing process data with the incidents of defects in the wafers (i.e., an excessive particle count on the wafers). In certain instances, for example, the particle count in the exhaust of the processing tool 16 may be high, but this does not necessarily indicate that the particle count contained on the wafer is high. Hence, the 100% real-time monitoring of the manufacturing process data is not reliable as an indicator that the particle count on a wafer is high.

This limitation in the use of in-situ monitoring to determine which wafer should be inspected with reliability is overcome in the present invention by the use of a neural network that correlates the in-situ manufacturing process data with surface scan data.

The inspection of a semiconductor wafer (i.e., the product) is made by a product inspection device 36 such as an Inspex machine, which is a wafer scanning machine made by Inspex of Boston, Mass. The wafer scanning machine is exemplary only, as other types of product inspection devices, and other wafer scanning machines in particular, may be used without departing from the spirit or scope of the present invention.

Manufacturing process data which has been gathered through the in-situ particle monitor 18, and the surface scan data collected by the product inspection device 36 on selected wafers is provided to the neural network 42 through an advanced process control 34. The advanced process control 34 is essentially a communication module between the neural network 42 and the manufacturing execution system 22. Using the neural network 42, the particle counts provided by the in-situ monitor (the in-situ manufacturing process data) and the particle counts provided during a surface scanning (the product inspection data) collected by the product inspection device 36 are correlated by the neural network 42. As an overview of operation, the particle counts from the in-situ monitor 18 are provided as the input to the neural network 42, and the particle counts from the surface scans of the wafers made by the product inspection device 36 are provided as the outputs of the neural network 42. The correlation procedure is performed for a first set of products, such as a test set of products, prior to the production run of products. With the correlation established, the in-situ particle monitor counts are used in the production run of products to identify which wafers should be inspected by the product inspection device 36, instead of the random selection of wafers in the prior art. The manufacturing process step performed by the processing tool 16 is monitored by the in-situ particle monitor 18 and the particle data (manufacturing process data) is transferred to the manufacturing execution system 22. Based on the correlation generated by the neural network 42, predicted values of the particle count on the wafers are then provided. These predicted particle counts serve as the criteria for selecting which wafers to inspect with the product inspection device 36.

Prior to the production runs of wafers, the neural network 42 needs to be trained in order to establish a correlation between the monitored data and the surface scan data. The neural network 42 is a conventional neural network module (language or toolbox).

In conventional arrangements, the correlation between the in-situ particle monitor 18 and the surface scanning data provided by the product inspection device 36 is hindered by low in-situ particle monitor counts due to clean chamber environment in newly-built facilities. The conventional techniques use frequency and threshold suggested by the in-situ particle monitor manufacturer in order to calculate correlations. However, with the present invention, the altering of the suggested sampling rates and thresholds from those suggested by the manufacturer result in better correlation. Further, the present invention provides for different correlations that depend upon the noise levels of the in-situ particle monitor counts and the size of the particles of interest on the wafers. In the following example, the size of the particles of interest are greater than 0.5 µm. This method provides a better correlation than merely correlating the total in-situ particle monitor count data with the total particle count by the product inspection device 36.

Figure 5:
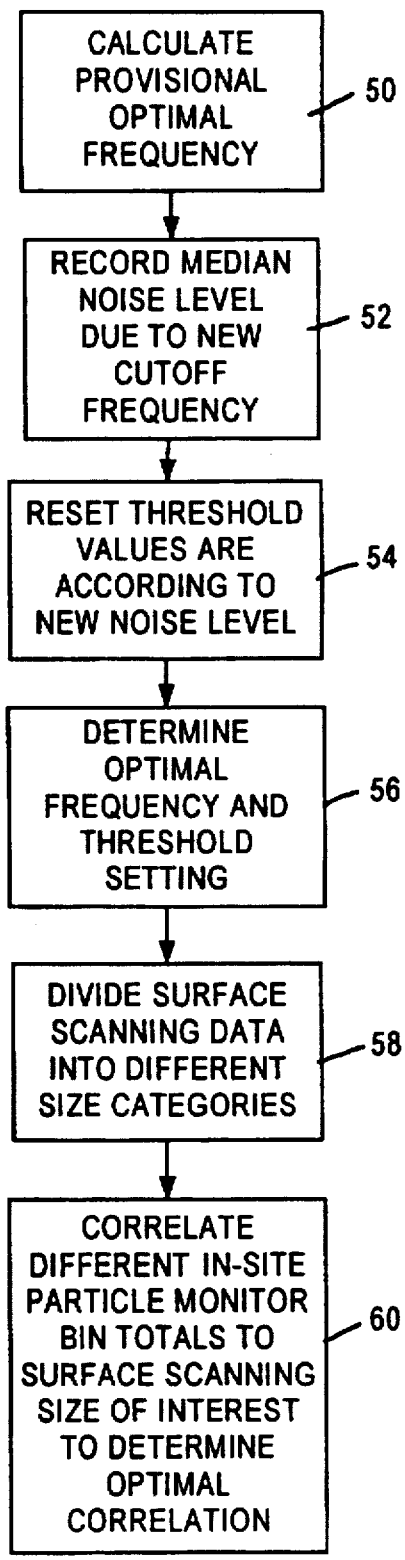
FIG. 5 is a flow chart of a method for establishing a correlation in accordance with an embodiment of the present invention.

An embodiment of the method of correlating the in-situ particle monitor count data with the surface scanning data is depicted in FIG. 5. In step 50, a provisional optimal sampling frequency is determined for a particular process recipe. This determination step is performed in a conventional manner utilizing the equations provided by the manufacturer of the in-situ particle monitor 18 using the gas flow rates, pressure, temperature, etc. The exact method of determining the optimal frequency in step 50 is not critical, however, since this is only a provisional optimal frequency.

In step 52, the median noise level due to the new cutoff frequency, which is the reverse of the data sampling rate, is recorded. The threshold values are then reset according to the new median noise level, as depicted in step 54. In step 56, the actual optimal frequency and threshold settings are determined. This step involves modifying the calculated frequency and threshold settings determined in step 50 based on the actual trial runs with test wafers. The most suitable frequency, the frequency of sampling that provides the best correlation, typically deviates somewhat from the calculated result of step 50.

In step 58, the surface scan data is divided into different size categories. Finally, in step 60, the different bin totals are correlated to the surface scanning data size-of-interest to determine the optimal correlation.

Figure 3:
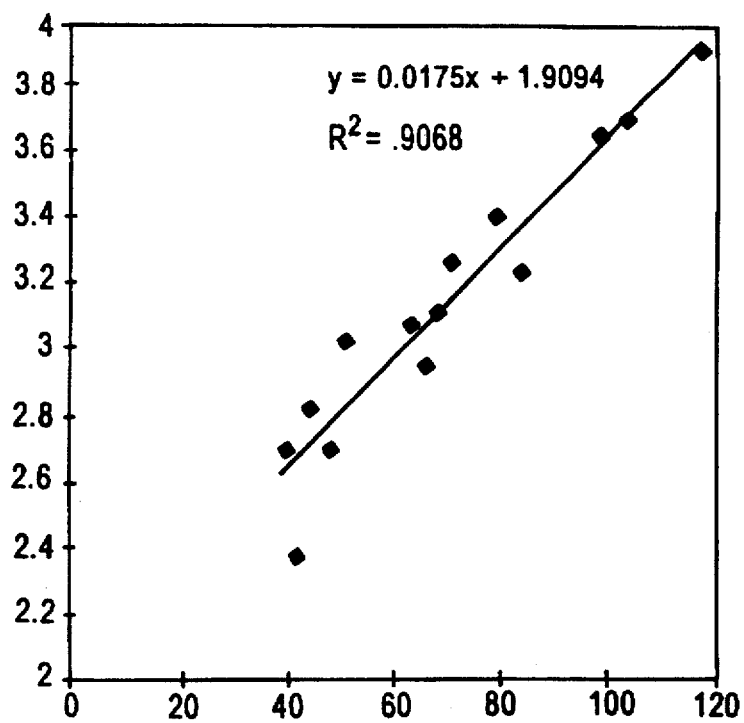
FIG. 3 is a graph depicting exemplary data for a specific manufacturing process at a specified noise level.
Figure 4:
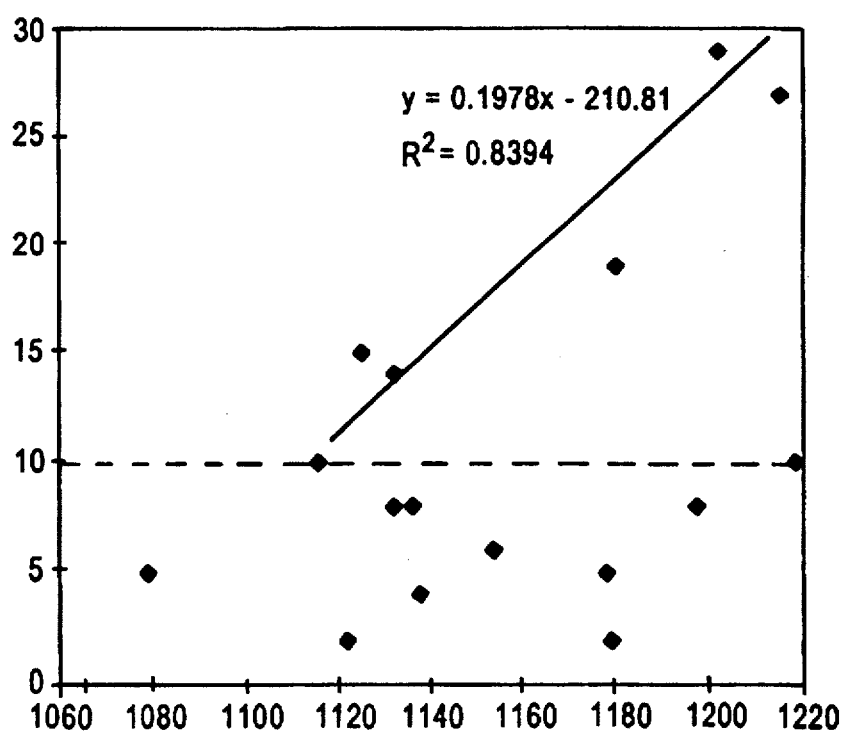
FIG. 4 is a graph depicting exemplary data of another manufacturing process for a different noise level.

FIGS. 3 and 4 depict exemplary results of the correlation for different bins. For example, FIG. 3 depicts a correlation for a specific threshold that was obtained using the method of FIG. 5 for a nitride etch process for a specific threshold setting. A correlation of 0.9068 is calculated for the exponential correlation for this nitride etch recipe for all of the data with at least 200 counts of particles as determined by the product inspection device 36.

FIG. 4 is a diagram similar to FIG. 3, but represents the data obtained for an oxide etch for all data with at least 10 particle counts as determined in the surface scanning performed by the product inspection device 36. A correlation of 0.8394 was obtained for all of the data with at least 10 particle counts.

Once a correlation has been obtained as described in FIG. 5, or in another manner, the particle counts from the in-situ particle monitor 18 and the product inspection device 36, respectively, are used to train the neural network 42. An exemplary embodiment of a method for training the neural network according to the present invention is depicted in the flow chart of FIG. 6. In step 70 a pre-processing of the data is performed. This includes filtering out the data in which the particle counts during the surface scanning are lower than a specified value. For example, particle counts under 200 for a nitride etch process and under 10 for an oxide etch process are filtered out. The pre-processing of the data continues in step 72, in which the remaining data is scaled and logged to minimize the error gradient. In step 74, the neural network is fed data at its inputs and corresponding outputs. The data from the in-situ particle monitor 18 is provided as the inputs to the neural network 42, while the particle data from the product inspection device 36 are provided as the outputs to the neural network 42. In step 76, a linear network of the neural network 42 identifies the general solution range, while a back propagation network fine tunes the result in step 78.

The neural network 42 is employed as the data analysis tool since it offers greater accuracy and robustness compared to other statistical methods. A neural network 42 has the ability to learn underlying patterns and relationships between any arbitrary input/output data set, and in turn, provide a corresponding model generalizing the input/output behavior. As a result, given any in-situ particle monitor value of data, the neural network 42 will be able to predict the most appropriate particle data as would be determined by a surface scanning of the wafer.

Figure 6:
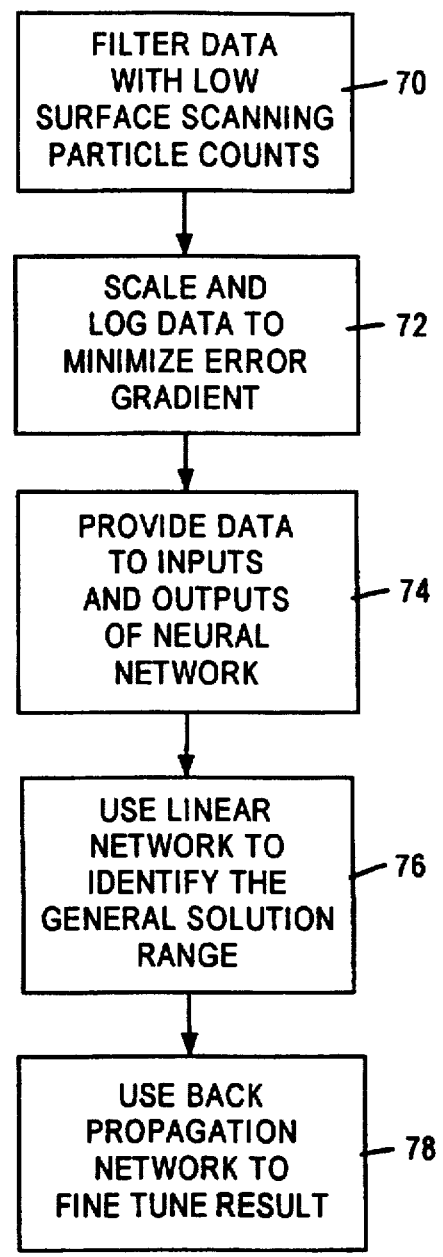
FIG. 6 is a flow chart of a method of training the neural network according to the present invention in accordance with an embodiment of the present invention.
Figure 7:
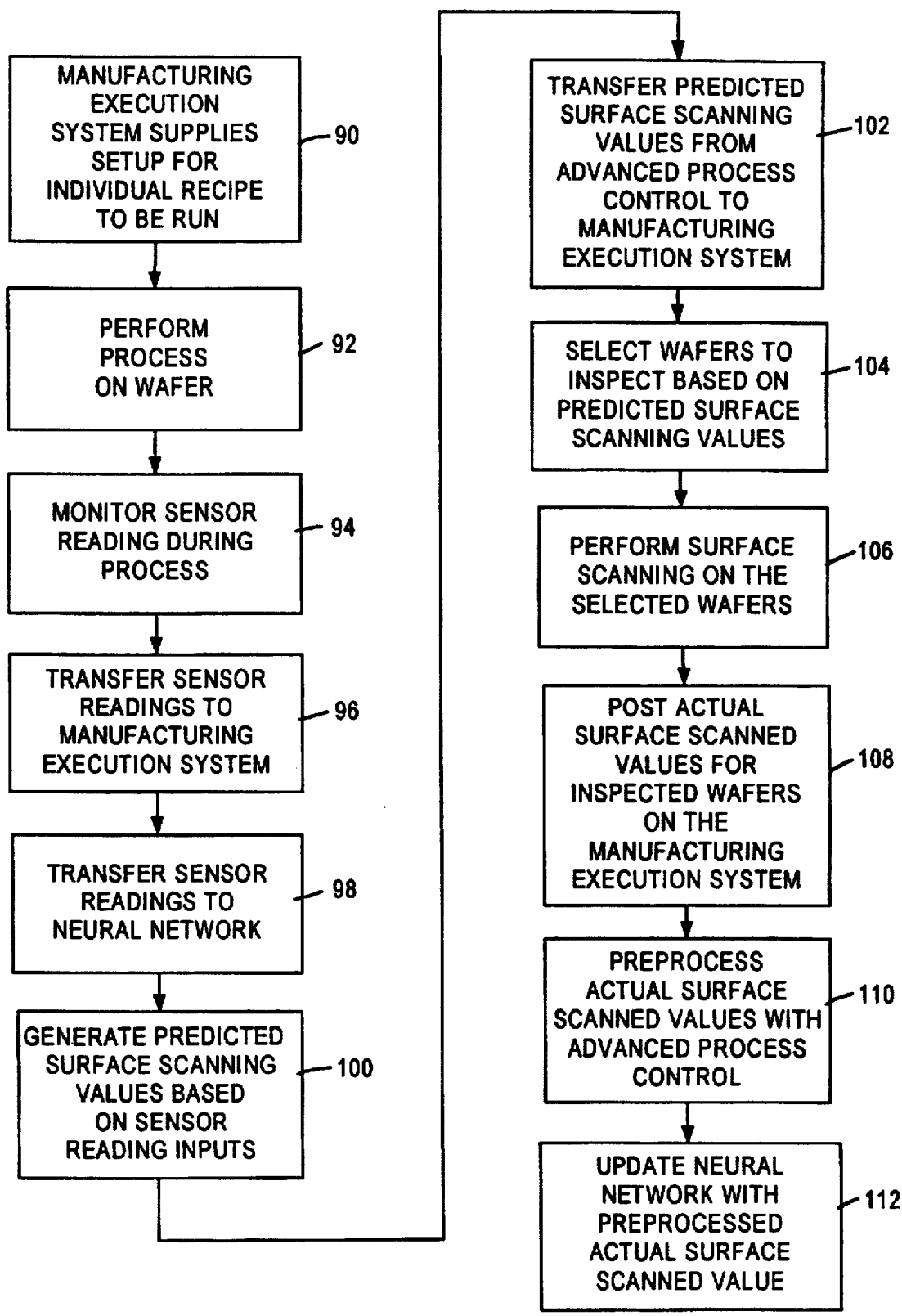
FIG. 7 is a flow chart of a method of operation of the processing station of FIG. 2 in accordance with an embodiment of the present invention.

The methods of FIGS. 5 and 6 may be performed for a plurality of etch recipes and the system can then be implemented into the manufacturing process. Once the in-situ particle monitor 18 is installed in the exhaust line of the processing tool 16 (e.g., an etcher) the manufacturing execution system 22 supplies the sensor setup information for the individual etch recipe to be run on a processing tool 16, as depicted in step 90 of FIG. 7. The manufacturing processing tool 16 performs the desired processing step on the wafer, in step 92. During the etching process, or other processing step, the in-situ particle monitor 18 is triggered to sense the in-situ manufacturing process data (step 94). This data may be, for example, particle counts in the exhaust line.

In step 96, the manufacturing process data (e.g., the in-situ particle monitor particle counts) are transmitted to the manufacturing execution system 22 for each wafer or lot of wafers (step 96). The advanced process control 34 downloads the manufacturing process data from the manufacturing execution system 22 and feeds this data to the neural network 42.

Different neural network models have already been developed for the specific etch recipes at this stage of the process, as discussed above and in accordance with the embodiments of FIGS. 5 and 6. Based upon the correlation for that specific etch recipe that is being performed by the processing tool 16, as well as the manufacturing processing data that has been transmitted by the in-situ particle monitor 18, the neural network 42 generates predicted product inspection data to the advanced process control 34. The predicted product inspection data represents the prediction of the data which would be collected by the product inspection device 36 for specific wafers (or wafer lots) upon inspection. In the exemplary embodiment, the product inspection device is a wafer scanning device that determines the number of particles on the surface of a wafer. After the predicted values have been generated and provided to the advance processing control 34 in step 100, the predicted values are transferred from the advance process control 34 to the manufacturing execution system 22, in step 102.

Based upon the predicted product inspection data values, wafers are selected for inspection by the product inspection device 36 in step 104. The advance process controller 34 identifies to the operators which wafers have high predicted product inspection values (e.g., high surface scan particle counts). In step 106, the wafers will be inspected using the product inspection device 36 to determine the actual particle counts on the wafers. These actual values of the product inspection data are then posted on the advance process controller 34 in step 108 through the manufacturing execution system 22. The advance process controller 34 pre-processes the product inspection data so that only those data points with a particle count higher than a specified value (dependent upon the particular etch recipe), together with their corresponding in-situ manufacturing process data particle counts, will be fed to the neural network 42 again. The neural network 42 updates its existing data analysis model in step 112 according to these additional in-situ manufacturing process data and product inspection data pairs. Hence, this system continuously improves its correlations using the neural network 42 as more wafers are processed and tested.

With the present invention, a 100% sampling of the manufactured wafers is effectively provided, since the data from the in-situ particle monitor will identify (through the use of the neural network and the established correlations) all of the wafers which are likely to have high particle counts. This provides the operators of the system with a much better control and monitoring of the processing tool than the conventional random sampling of wafers.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method of inspecting products for defects in response to in-situ monitoring of a manufacturing process, comprising the steps of:

in-situ monitoring of a manufacturing process that produces a first set of products to collect a set of a first type of data;

inspecting the set of products to collect a set of product inspection data;

correlating the set of the first data type and the set of product inspection data to form a correlation between the set of the first data type and the set of product inspection data;

manufacturing a second set of products and performing in-situ monitoring of the manufacturing process to collect first type data for the second set of products; and selecting products of the second set of products to inspect for the product inspection data based on the first type of data for the second set of products in accordance with the correlation.

2. The method of claim 1, wherein the step of correlating includes providing the set of the first data type and the set of the product inspection data for the first set of products to a neural network that forms the correlation.

3. The method of claim 2, wherein the manufacturing process is performed in a processing chamber and the products are semiconductor wafers, and wherein the steps of in-situ monitoring includes collecting data on particles in the processing chamber as the first type of data.

4. The method of claim 3, wherein the step of collecting data on particles in the processing chamber includes counting the number of particles in an outflow of the processing chamber.

5. The method of claim 3, wherein the steps of inspecting products for the product inspection data includes scanning a surface of the semiconductor wafers to determine particle counts on the semiconductor wafers.

6. The method of claim 5, further comprising the steps of providing the first type of data and the product inspection data for the selected products of the second set of products to the neural network, and refining the correlation between the set of the first data type and the set of the product inspection data.

7. The method of claim 6, wherein the manufacturing process is performed in accordance with one of a plurality of different recipes, the method further comprising the step of providing a different correlation for each of the different recipes.

8. A method of performing total sampling of products for defects comprising:

correlating product inspection data with in-situ manufacturing process data to form a correlation between the product inspection data and the in-situ manufacturing process data;

performing a manufacturing processing step on a set of products;

collecting in-situ manufacturing process data during the manufacturing processing step on the set of products;

selecting which products among the set of products to collect product inspection data from based on the in-situ manufacturing process data collected during the manufacturing processing step on the set of products and the correlation between the product inspection data and the in-situ manufacturing process data; and collecting the product inspection data from the selected products.

9. The method of claim 8, wherein the step of correlating includes: in-situ monitoring of a previous set of products subjected to the manufacturing process step prior to the set of products to collect in-situ manufacturing process data for the previous set of products; inspecting the previous set of products to collect product inspection data for the previous set of products; and providing the in-situ manufacturing process data and the product inspection data for the previous set of products to a neural network that forms the correlation.

10. The method of claim 9, wherein the manufacturing processing step is performed in a processing chamber and the products are semiconductor wafers, and wherein the steps of collecting in-situ manufacturing process data includes collecting data on particles in the processing chamber.

11. The method of claim 10, wherein the step of collecting data on particles in the processing chamber includes counting the number of particles in an outflow of the processing chamber.

12. The method of claim 10, wherein the steps of collecting the product inspection data includes scanning a surface of the semiconductor wafers to determine particle counts on the semiconductor wafers.

13. The method of claim 9, further comprising the steps of providing the in-situ manufacturing process data and the product inspection data for the selected products to the neural network, and refining the correlation between the in-situ manufacturing process data and the product inspection data.

14. The method of claim 13, wherein the manufacturing process step is performed in accordance with one of a plurality of different recipes, the method further comprising the step of providing a different correlation for each of the different recipes.

15. An arrangement for monitoring a manufacturing process performed on a product, comprising:

an in-situ monitor that monitors at least one parameter of the manufacturing process and generates in-situ manufacturing process data;

a product inspection device that inspects products and generates product inspection data;

a neural network that receives the in-situ manufacturing process data and the product inspection data and correlates the in-situ manufacturing process data and the product inspection data; and a process controller that identifies which products should be inspected by the product inspection device based on the in-situ manufacturing process data and the correlation between the in-situ manufacturing process data and the product inspection data.

16. The arrangement of claim 15, wherein the in-situ monitor is a particle monitor that determines the number of particles in a processing chamber.

17. The arrangement of claim 16, wherein the particle monitor includes a particle detector in the outflow of the processing chamber.

18. The arrangement of claim 16, wherein the product inspection device is a surface scanner that scans the surface of products.

19. The arrangement of claim 18, wherein the products are semiconductor wafers.

* * * * *

UNITED STATES PATENT AND TRADEMARK OFFICE
CERTIFICATE OF CORRECTION

PATENT NO.  : 5,896,294
DATED       : April 20, 1999
INVENTOR(S) : Wanyee Apple Chow et al.

It is certified that error appears in the above-identified patent and that said Letters Patent is hereby corrected as shown below:

On the title page, item [54]
delete "An Apparatus And Method" and in the Claim 1, line 66, after the first occurrence of "the" insert --first--.

Signed and Sealed this

Twenty-third Day of November, 1999

Attest:

Q. TODD DICKINSON

Attesting Officer

Acting Commissioner of Patents and Trademarks